United States Patent [19]

Dick

[11] Patent Number: 4,558,635
[45] Date of Patent: Dec. 17, 1985

[54] AIR-EXTRACTION DEVICE FOR MOTOR VEHICLES

[75] Inventor: Heinz Dick, Odenthal, Fed. Rep. of Germany

[73] Assignee: Ford Motor Company, Dearborn, Mich.

[21] Appl. No.: 639,550

[22] Filed: Aug. 10, 1984

[30] Foreign Application Priority Data

Oct. 4, 1983 [DE] Fed. Rep. of Germany ....... 3336003

[51] Int. Cl.$^4$ ............................................. B60H 1/24
[52] U.S. Cl. .................................................... 98/2.18
[58] Field of Search ...................... 98/2, 2.18, DIG. 10; 296/91

[56] References Cited

U.S. PATENT DOCUMENTS 2,775,184 12/1956 Pipes ........................................... 98/2
4,399,739 8/1983 Dean ............................ 98/DIG. 10 X

FOREIGN PATENT DOCUMENTS 2426937 12/1975 Fed. Rep. of Germany .
2844822 4/1980 Fed. Rep. of Germany .
3007326 4/1981 Fed. Rep. of Germany .

Primary Examiner—Harold Joyce
Attorney, Agent, or Firm—Daniel M. Stock; Clifford L. Sadler

[57] ABSTRACT

In an air-extraction device for motor vehicles, in which a passenger-compartment air-extracting duct opens to the outside air in the vicinity of a rear light adjacent its light lens, the rear light, which is disposed in an opening in the bodywork and is supported on a continuous seal on the surrounding part of the bodywork by way of webs, is connected by way of an opening to the interior of the vehicle and is provided with air ducts extending in its edge area. The air ducts lead to the outside air by way of an outlet opening. Where appropriate, the lens may be provided with outlet openings disposed in areas which are ineffective in terms of illumination.

3 Claims, 3 Drawing Figures

AIR-EXTRACTION DEVICE FOR MOTOR VEHICLES

BACKGROUND OF THE INVENTION

1. Field of Invention

The invention relates to an air-extraction device for motor vehicles in which a passenger-compartment air-extracting duct opens to the outside air in the vicinity if a rear light adjacent its light lens.

2. Description of the Prior Art

Such a device is shown in German Offenlengungsschrift No. 24 26 937. In the air-extraction device of this patent application, the air guide ducts in the region of the rear light are formed by adjacent parts of the bodywork shaped accordingly. There is no mention of a lining of the outlet openings which may possibly be necessary.

German Offenlengungsschrift No. 28 44 822 discloses a specially shaped light lens for the rear light of a motor vehicle, outlet openings for a passenger-compartment air-extracting duct being provided in the outer lateral area of the rear light. There is no mention, however, of the compartments which form the passenger-compartment air-extracting duct and the outlet opening.

German Offenlengungsschrift No. 30 07 326 discloses a rear light for motor vehicles in whose edge area formed by double webs are formed ducts for the ventilation and air extraction of the rear light. On the one hand these ducts must be channelled in a somewhat labyrinthine manner in order to prevent the ingress of water and dirt into the rear light, and on the other hand they must ensure a water drain for condensation water occurring in the light.

The first two of the above patent applications clearly indicate that the underpressure required for an effective air extraction from the passenger compartment arises in the region of the rear light of a motor vehicle, in particular in its outer lateral region, but there is no mention of the necessary components which are required for forming suitable venting ducts and outlet openings.

Although the last of the above patent applications discloses venting ducts formed in a light, the light itself is completely sealed off from the interior of the vehicle by a continuous seal.

SUMMARY OF THE INVENTION

The present invention seeks to provide an improved air-extraction device for motor vehicles of the type described in such a way that without additional components the necessary air ducts and, if desired, suitable covers of the outlet openings are available.

According to the present invention, there is provided an air-extraction device for motor vehicles in which a passenger-compartment air-extracting duct opens to the outside air in the vicinity of a rear light adjacent its light lens, wherein the rear light is adapted to be disposed in an opening in the bodywork and is sealed relative to the surrounding part of the bodywork by way of webs, and wherein the rear light is connected by way of an opening to the interior of the vehicle, and is provided with air ducts leading from the latter opening to an external outlet opening.

The air extraction device of the invention ensures that without additional components and only with the assembly of the appropriately designed rear light, the interior of the vehicle is connected—by way of air-extracting ducts which are protected from water jets—to the outside air in which the underpressure required for an air-extraction device is present.

Preferably, the outlet opening is formed in a part of the lens of the rear light which does not affect the illumination.

In a preferred embodiment of the invention, the air ducts are formed in an edge area or all around the rear light and are constructed in the form of double webs extending essentially parallel to one another on the lamp holder and/or on the light lens, the ducts being formed upon connecting the lamp holder to the light lens. In this construction, air ducts, which are protected from water jets and are channelled in a curved manner in the edge region of the rear light, are formed with a suitable large cross-section, the light holder and the light lens being formed conventionally in the inexpensive injection-molding process.

The outlet openings may conveniently be constructed in the form of laminar slots in an area of the light lens which extends around the corner of the bodywork and may be ineffective in terms of illumination. This can provide for particularly attractive styling and can also influence the suction effect of the air-extraction device.

Non-return valves or sound-insulating foam linings may, if desired, be provided in the air ducts formed on the rear light. In such an embodiment, a reversal of air extraction and the penetration of road noise may be avoided.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1:
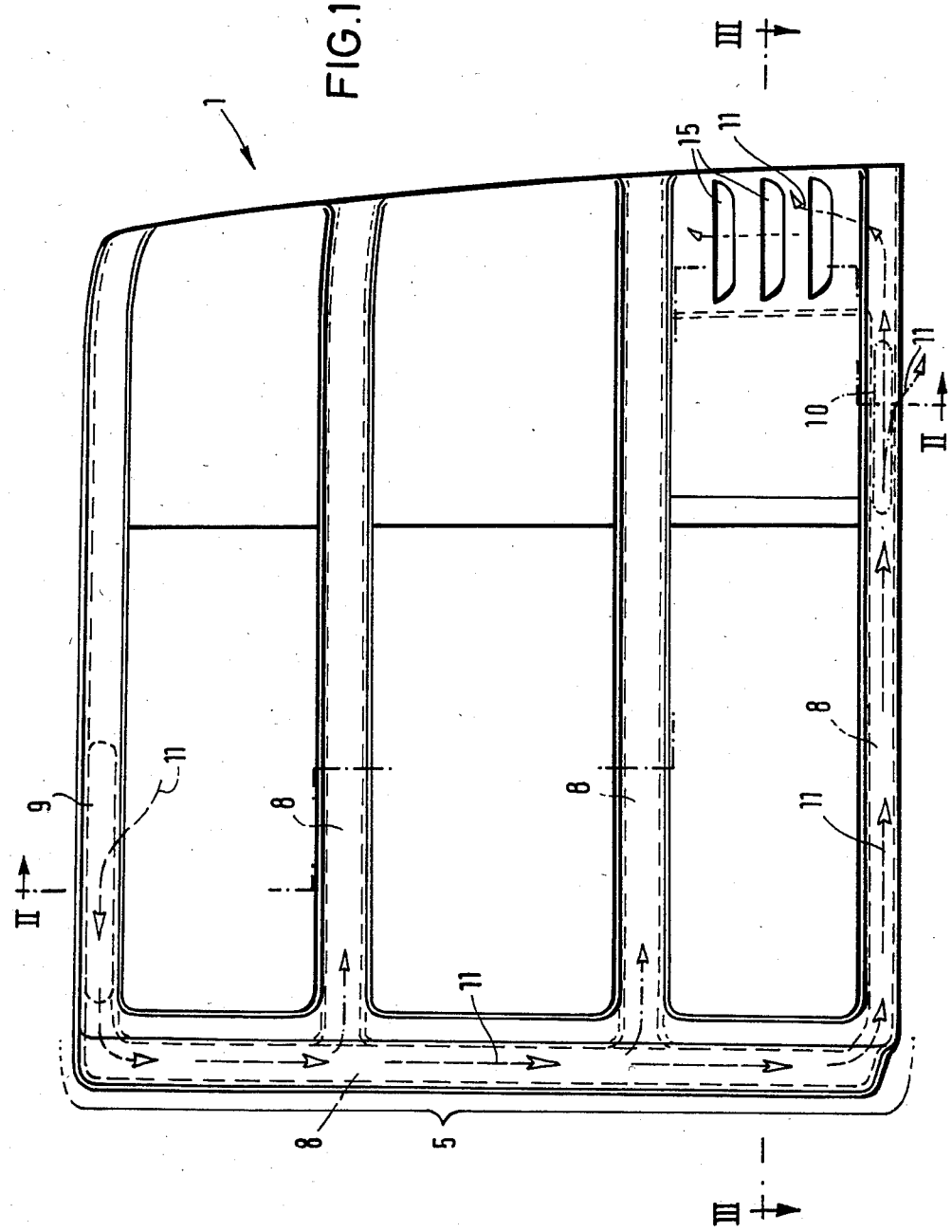
FIG. 1 is an elevation of a rear light of the preferred configurations with air ducts indicated in broken lines and by arrows.
Figure 2:
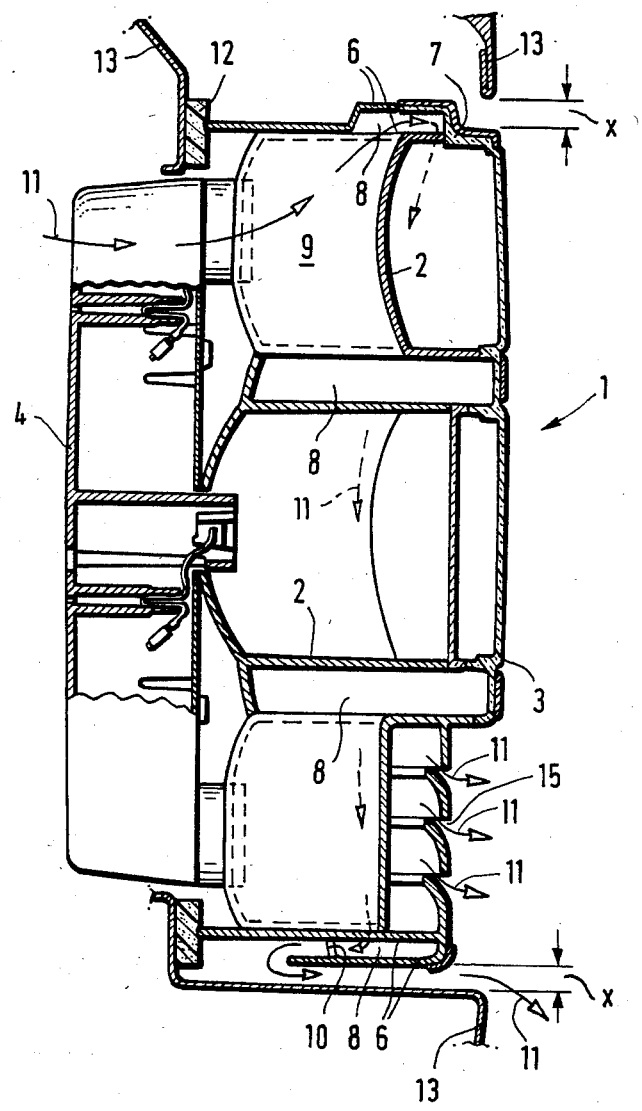
FIG. 2 is a vertical section along the line II—II in FIG. 1.
Figure 3:
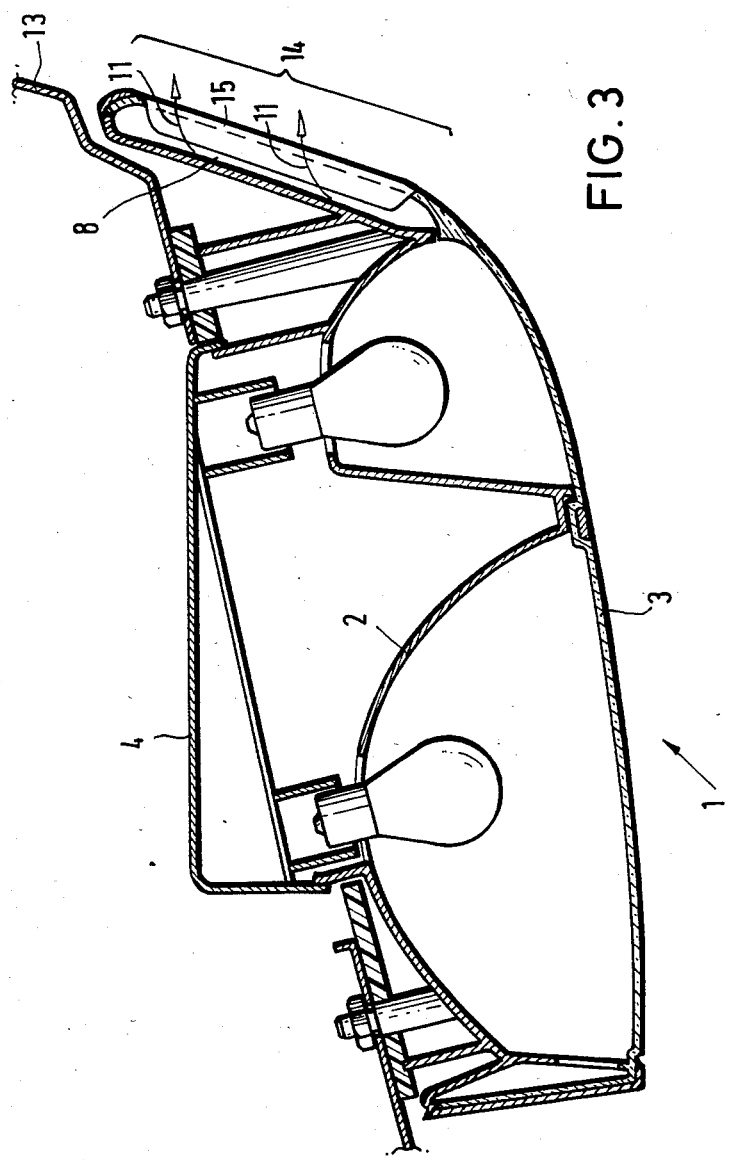
FIG. 3 is a section along the line III—III in FIG. 1.

The rear light 1 illustrated in FIGS. 1 to 3 essentially comprises a lamp holder 2 which is covered on the outside by a lens 3 and on the inside by a wiring cover 4.

The lamp holder 2 is provided in a lateral edge area 5 or all around with double webs 6 which are closed by corresponding connection parts 7 of the lens to form air ducts 8. The lamp holder 2 and the lens 3 may be joined in known manner by adhesion, butt-welding with heat reflectors or the like. The air ducts 8 extending over the edge area 5 communicate with the interior of the vehicle by way of an overhead opening 9 and with the outside air by way of an opening 10 underneath. The air ducts 8 are shown in broken lines in FIG. 1 and arrows 11 indicate the flow pattern.

In the case where a rear light 1 is supported on a continuous seal 12 on the surrounding part 13 of the bodywork by way of webs on the lamp holder 2, and where the outer periphery of the rear light 1 is provided with a gap X from the surrounding part of the bodywork, the arrangement of separate outlet openings may be dispensed with as the air flowing away may be discharged by way of this gap X.

For reasons of styling, however, it is often desirable to maintain the gap between the rear light 1 and the surrounding part 13 of the bodywork as small as possible, with the result that there is inadequate cross-section for the outlet openings. In such an arrangement of the rear light 1, the embodiment of the invention shown in FIG. 3 may be used. Here, air outlet openings arranged in the form of laminar slots 15 are provided in an area 14 of the light lens 3 which is drawn far around the corner of the bodywork and which is ineffective in terms of illumination.

In this arrangement, the required cross-section of outlet openings may be ensured and, furthermore, the air-extracting effect may be improved by the arrangement of the laminar slots and by the positioning in the laterally outside area of the rear light. In this connection, as a continuation of the design of the light lens, this area may be kept substantially inconspicuous or, if desired for reasons of styling, it may be offset accordingly and made prominent as an air-extraction cover.

In the case of the rear light 1 illustrated in FIG. 2, spaces are provided between the individual horizontal rows of the light chamber. In an appropriate structural arrangement, these space may, of course, also be used for forming air ducts, which then open to the outside air by way of horizontal outlet openings arranged between the individual bands of lights.

Resilient non-return valves or sound-proofing foam linings, which are not shown in the drawings but which may be necessary if a reversal of air extraction or the transmission of external noise into the passenger compartment is to be avoided, may, of course, be disposed in a known manner in the air ducts 8 formed in the rear light 1.

Although not provided for in the example of the embodiment illustrated, it is, of course, also possible to include necessary ventilation and air extraction of the light chambers of the rear light in the air ducts provided for the air-extraction device.

I claim:

1. In a motor vehicle having a rear light including a lamp holder and a lens disposed in an opening in a rear portion of the vehicle bodywork, an air-extraction device wherein the rear light is sealed relative to portions of the bodywork adjacent the opening by webs, the rear light is connected through an opening to the interior of the vehicle, air ducts external to the lamp holder are provided in the rear light leading from the opening, an outlet opening is provided between the ducts and the exterior of the vehicle adjacent the rear light lens and the air ducts are formed in at least an edge area of the rear light and are constructed in the form of double webs extending essentially parallel to one another between the lamp holder and the light lens, the ducts being formed upon the fixed sealing engagement of the lamp holder to the light lens.

2. An air-extraction device as defined in claim 1, wherein the outlet opening is formed in a part of the lens of the rear light which does not affect the illumination of the light.

3. An air-extraction device according to claim 1, wherein the outlet openings are constructed in the form of laminar slots and are provided in an area of the light lens which extends around a corner to a side portion of the bodywork.

* * * * *